Figure 1:
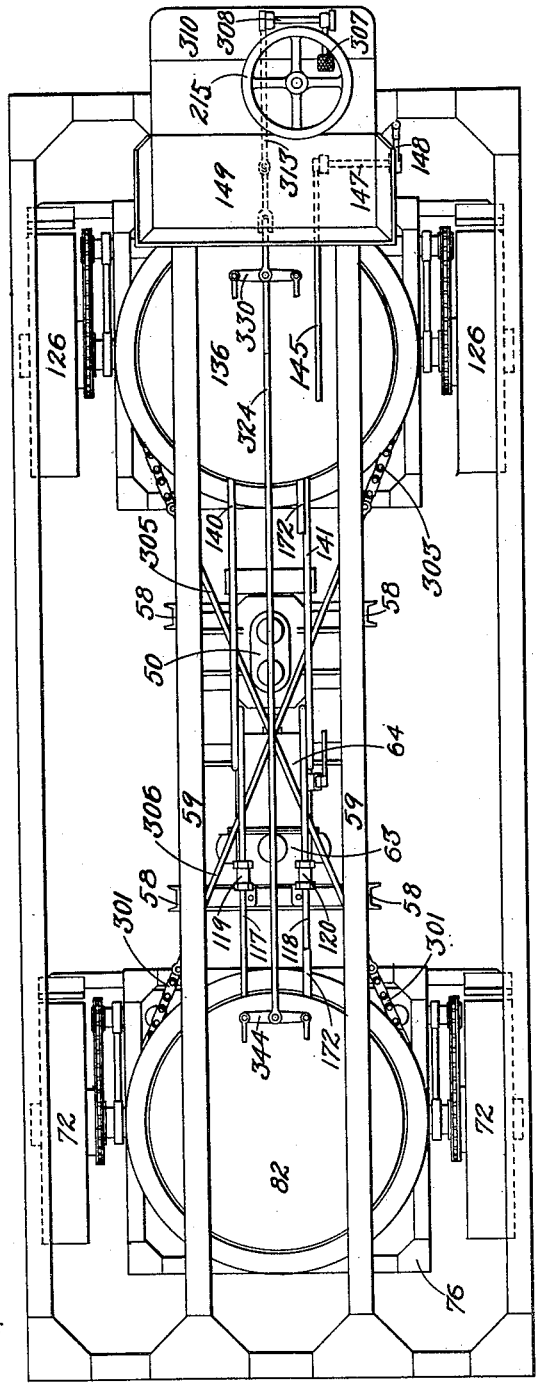

C. M. MANLY.
MOTOR VEHICLE.
APPLICATION FILED OCT. 4, 1906.

1,101,864.

Patented June 30, 1914.
10 SHEETS—SHEET 1.

WITNESSES:
James C. Barnaby
Ida M. Hatch

INVENTOR
Chas. M. Manly
BY
Smith & Frazier
ATTORNEYS.

C. M. MANLY.
MOTOR VEHICLE.
APPLICATION FILED OCT. 4, 1906.

1,101,864.

Patented June 30, 1914.
10 SHEETS—SHEET 2.

WITNESSES:
James C. Barnaby
Ida M. Hatch

INVENTOR
Chas. M. Manly,
BY
Smith & Frazier,
ATTORNEYS.

C. M. MANLY.
MOTOR VEHICLE.
APPLICATION FILED OCT. 4, 1906.

1,101,864.

Patented June 30, 1914.
10 SHEETS—SHEET 3.

WITNESSES:
James C. Barnaby
Ida M. Hatch

INVENTOR
Chas. M. Manly,
BY
Smith & Frazier
ATTORNEYS.

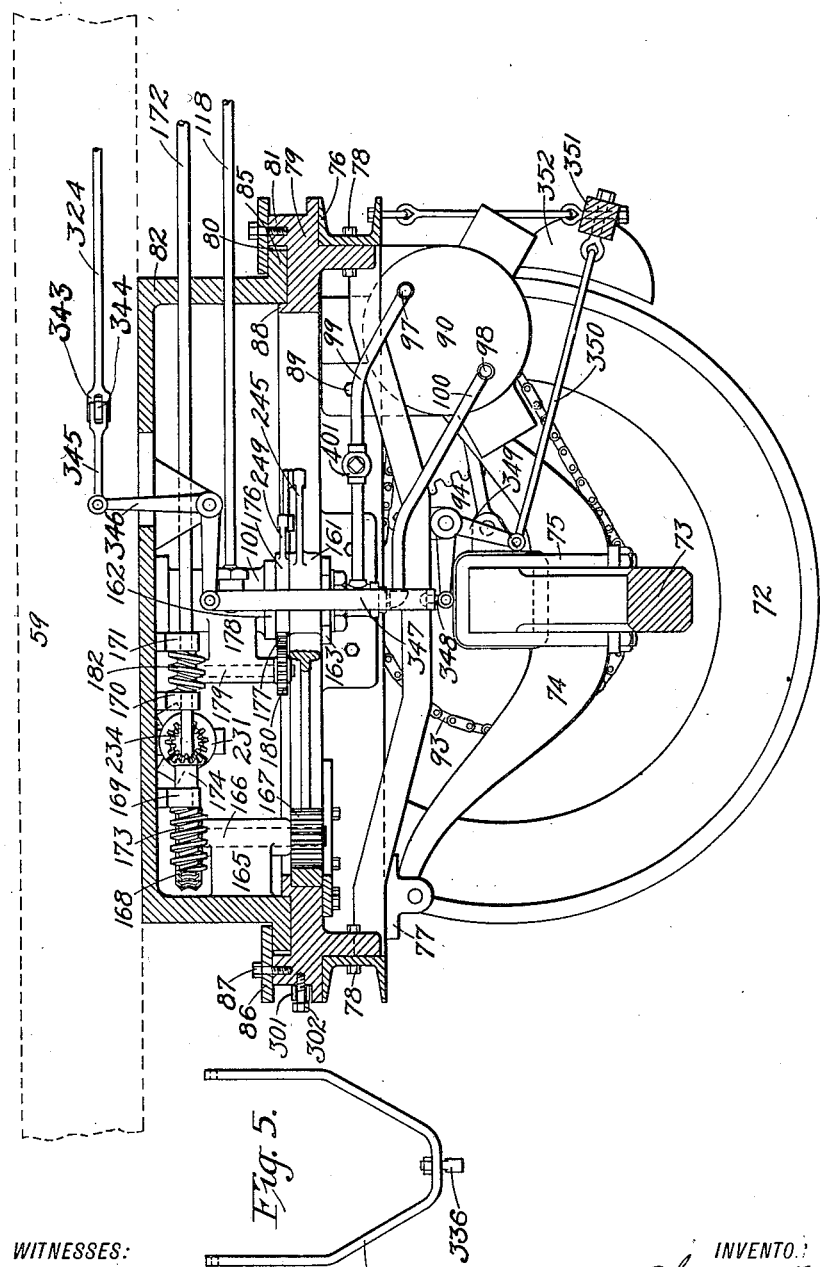

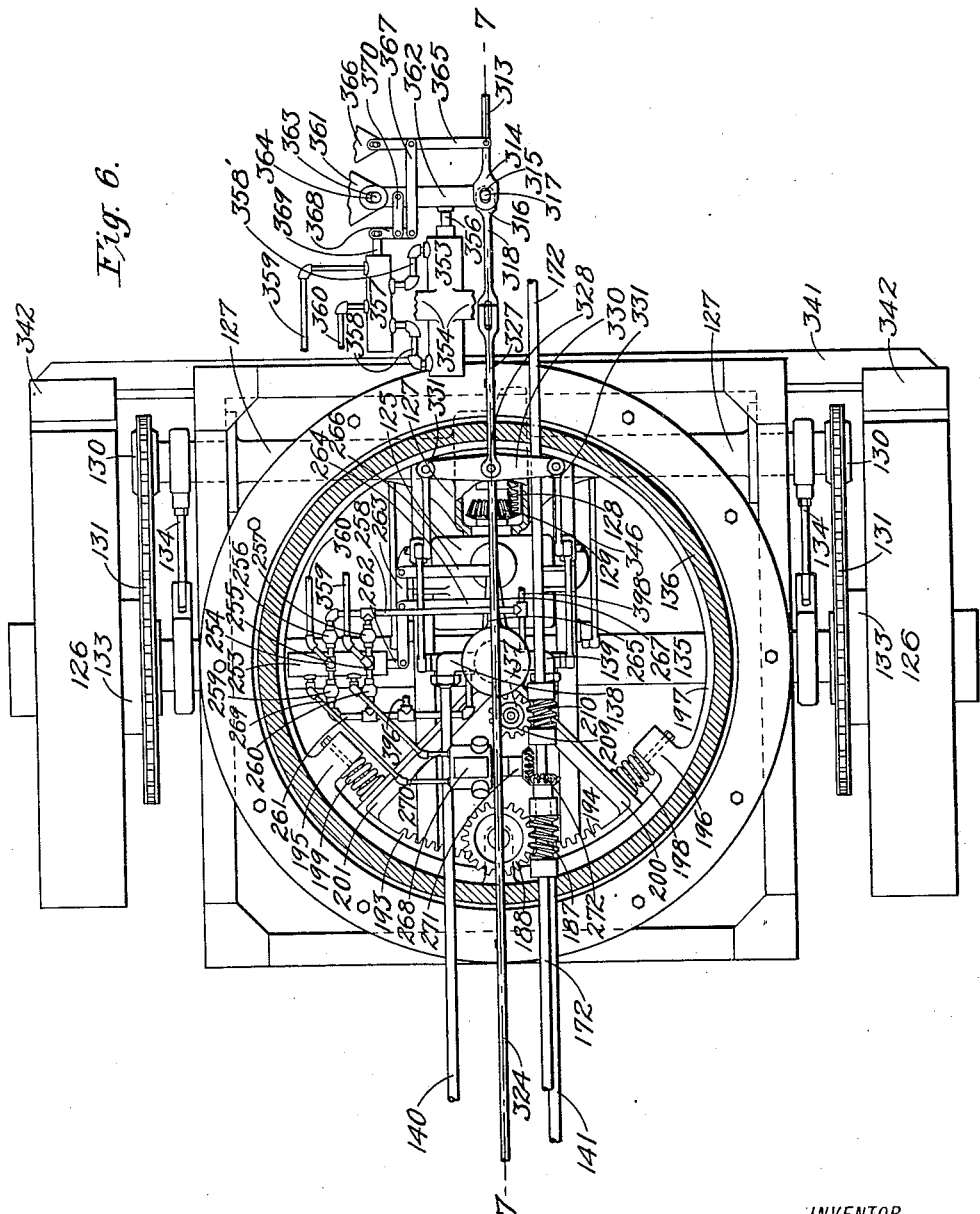

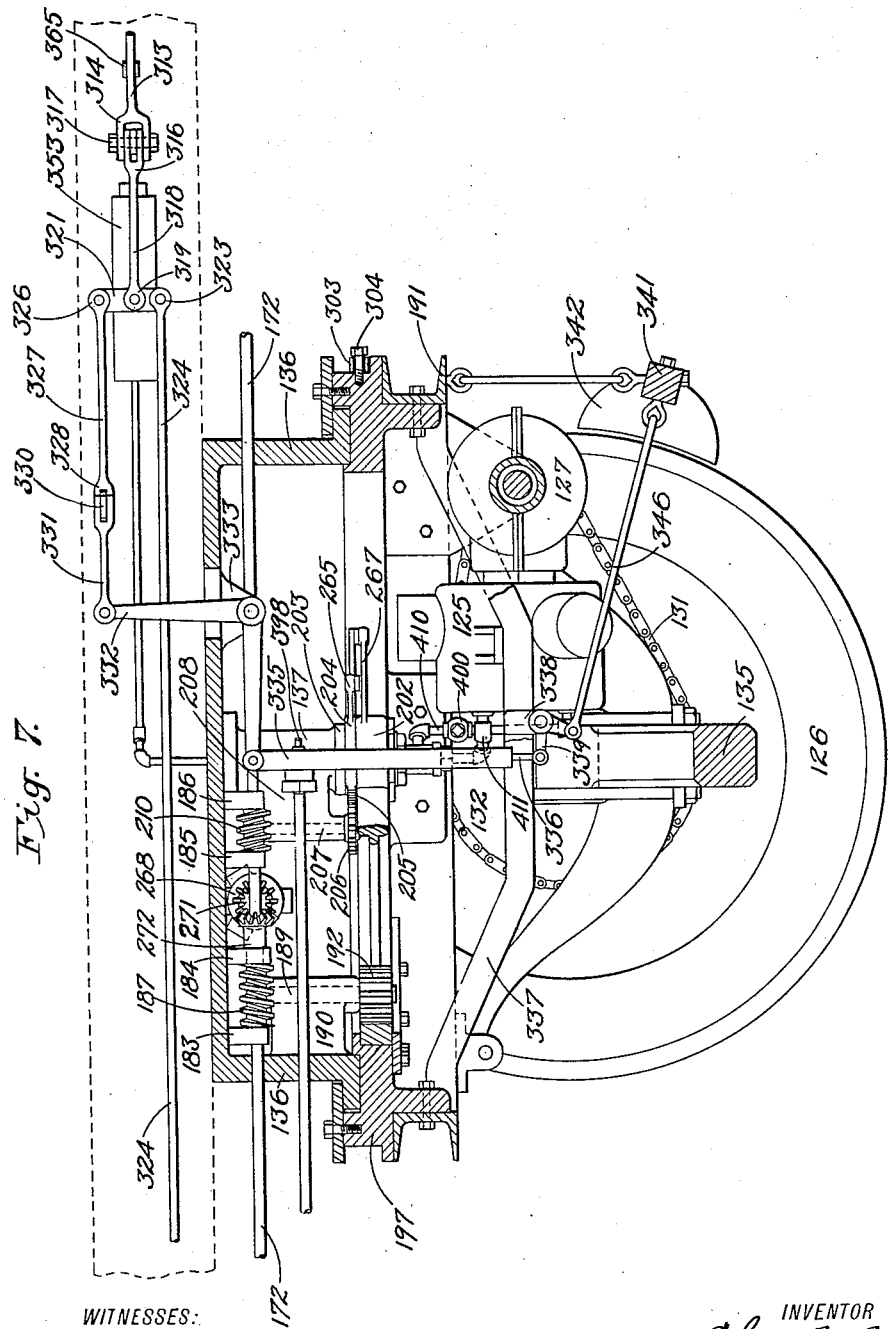

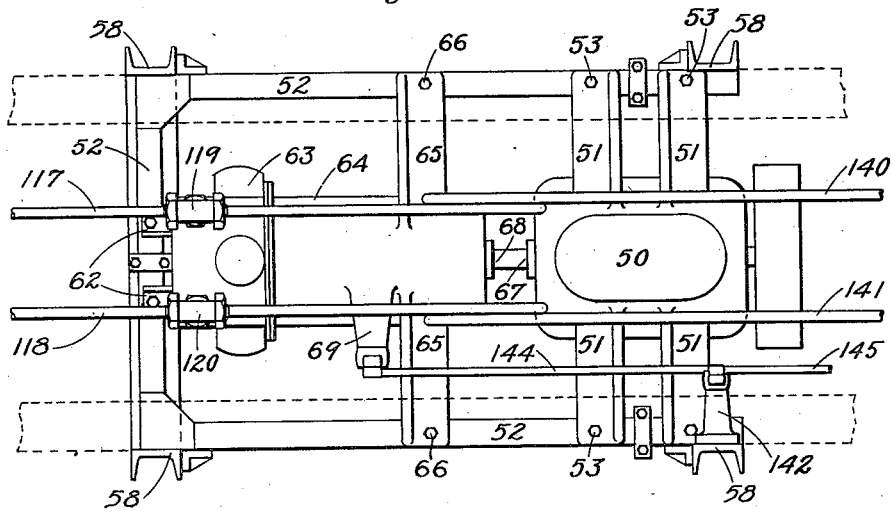
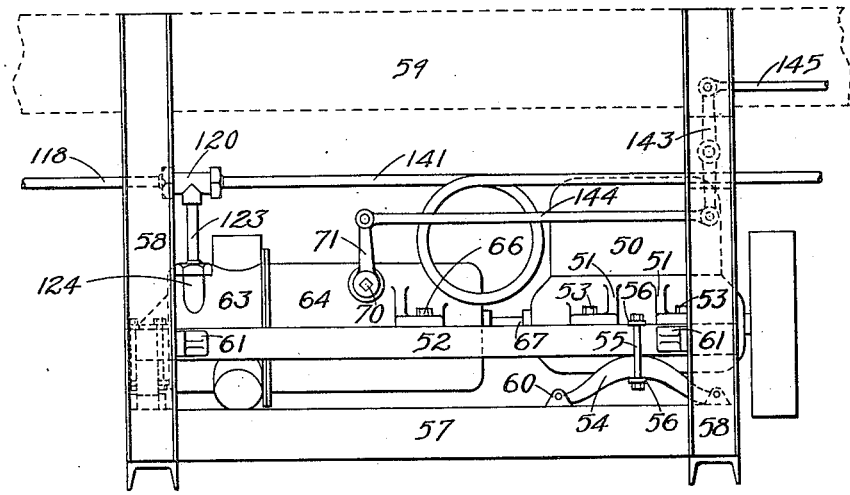

C. M. MANLY.
MOTOR VEHICLE.
APPLICATION FILED OCT. 4, 1906.
1,101,864.
Patented June 30, 1914.
10 SHEETS—SHEET 8.
Fig. 11.
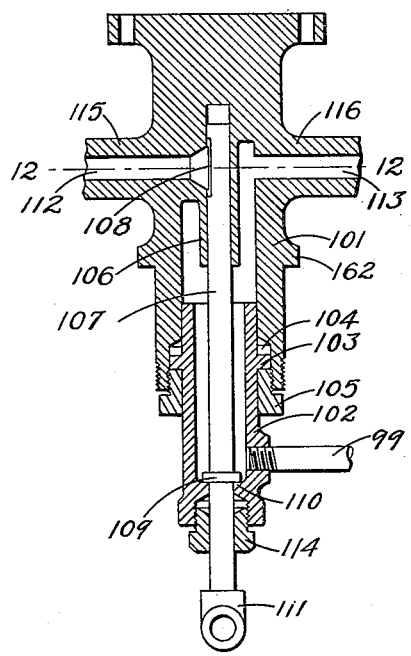
Fig. 12.
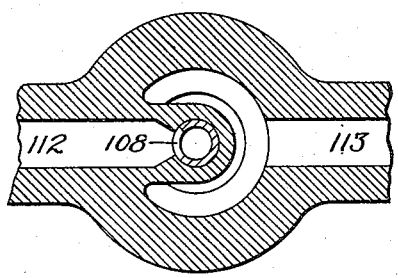
Fig. 10.
Fig. 25.
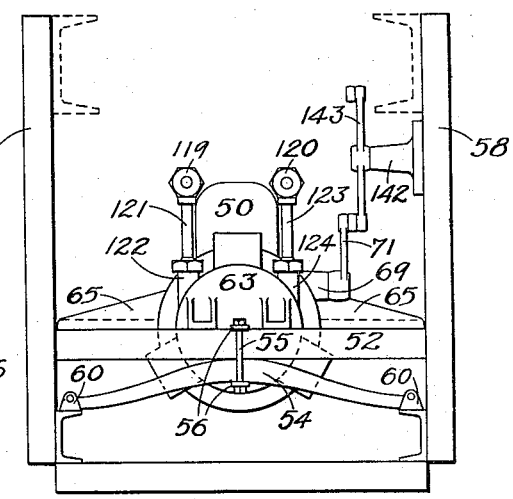
WITNESSES:
James C Barnaby
Ida M. Hatch
INVENTOR
Chas. M. Manly,
BY
Smith & Frazier,
ATTORNEYS.

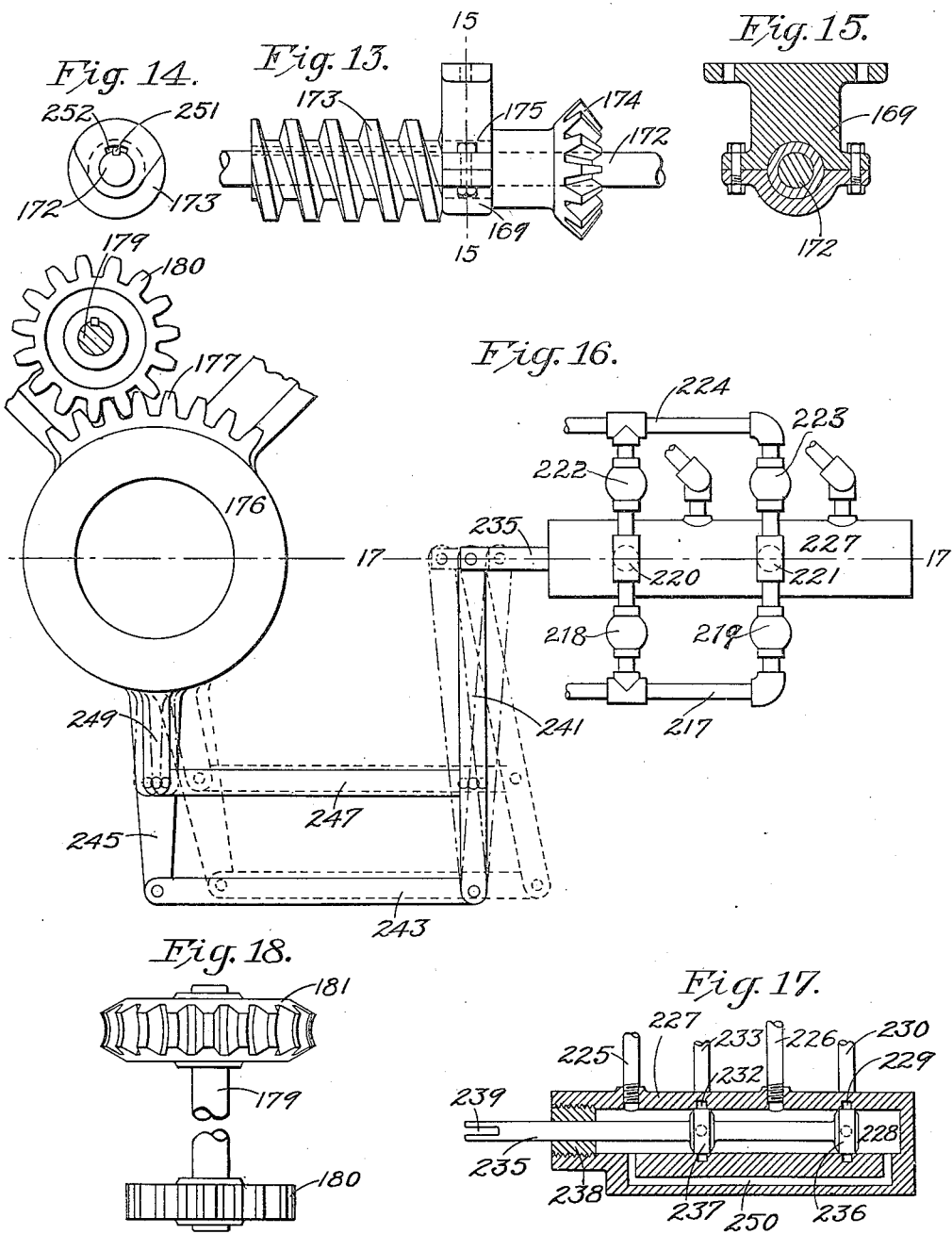

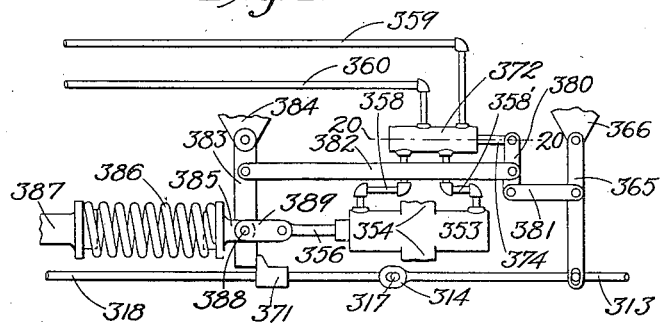
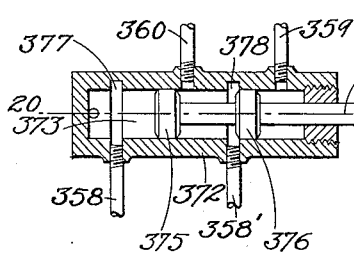
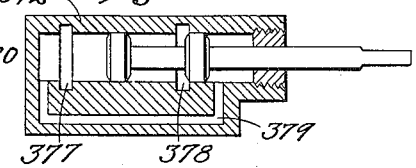
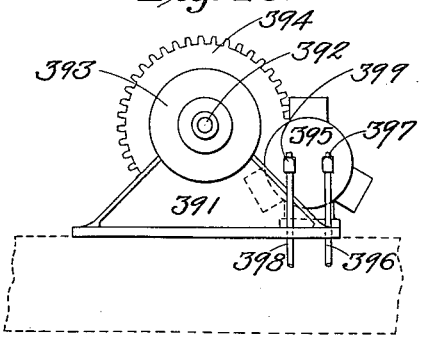
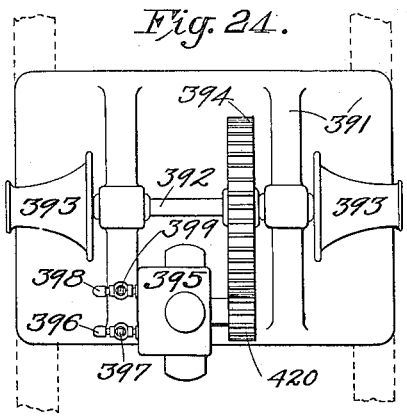

UNITED STATES PATENT OFFICE.

CHARLES M. MANLY, OF NEW YORK, N. Y.

MOTOR-VEHICLE.

1,101,864.  Specification of Letters Patent.  Patented June 30, 1914.

Application filed October 4, 1906. Serial No. 337,438.

*To all whom it may concern:*

Be it known that I, CHARLES M. MANLY, a citizen of the United States, residing in New York city, county and State of New York, have invented certain Improvements in Motor-Vehicles, of which the following is a specification.

This invention relates to improvements in motor vehicles.

One object of this invention is to provide an improved motor vehicle in which all of the wheels may be employed as both driving and steering wheels and in which all of them may be acted upon by brakes.

Another object is to provide means for utilizing power from the driving engine for steering, braking and hoisting.

With these and further objects, hereinafter more particularly pointed out, in view, my invention consists of a motor vehicle embodying two or more trucks, each supplied with a pair of wheels which are rotatable on their respective axles but maintain fixed planes of motion with reference to their respective trucks which themselves are rotatable through a sufficient angle for steering purposes; a driving engine with means for transmitting the power therefrom to each of the said wheels; a steering device whereby the said trucks may be angularly adjusted with reference to the said vehicle, with a correlating device whereby the trucks will be maintained in their proper angular relation to each other and means for utilizing power from the engine for causing the angular adjustment of the trucks in synchronism with the motions of a manually operated steering element; means for applying brakes to the said wheels and means for utilizing power from the said engine for controlling the brakes in synchronism with the motions of a manually operated brake control element; and means for utilizing the power from the said engine for operating a winch or hoisting drum; and my invention further consists in the novel construction and details thereof with reference to the accompanying drawings, as hereinafter described, and more particularly pointed out in the claims.

The accompanying drawings clearly illustrate a structure embodying the features of my invention.

Figure 2:
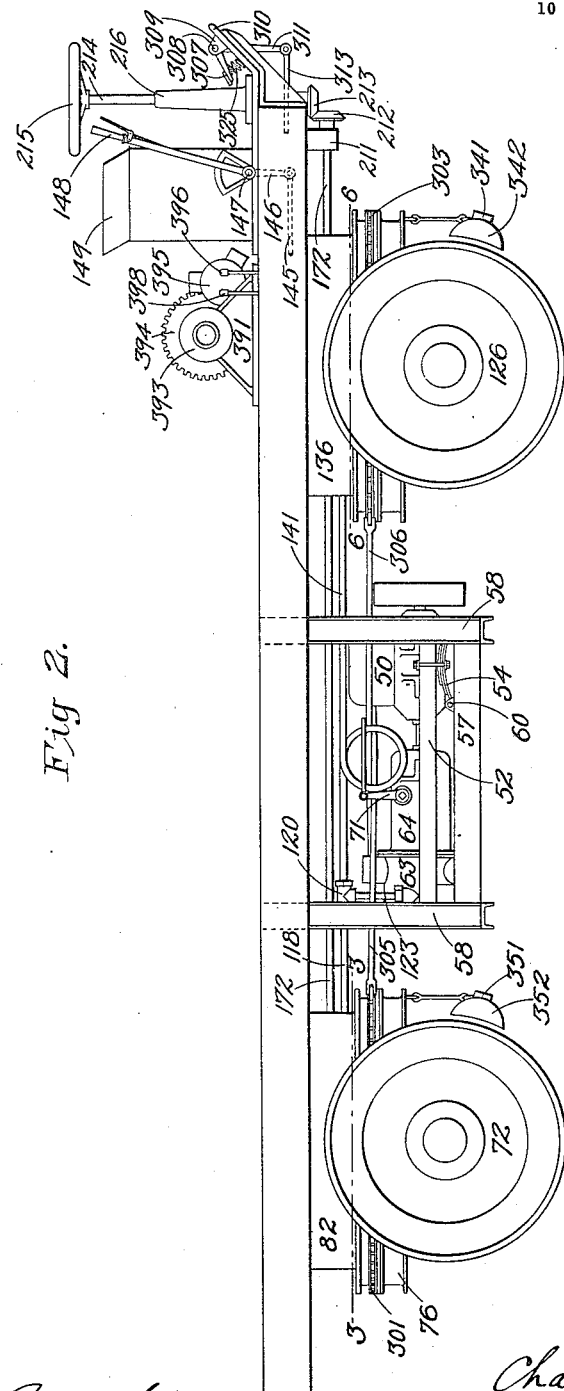
Figure 3:
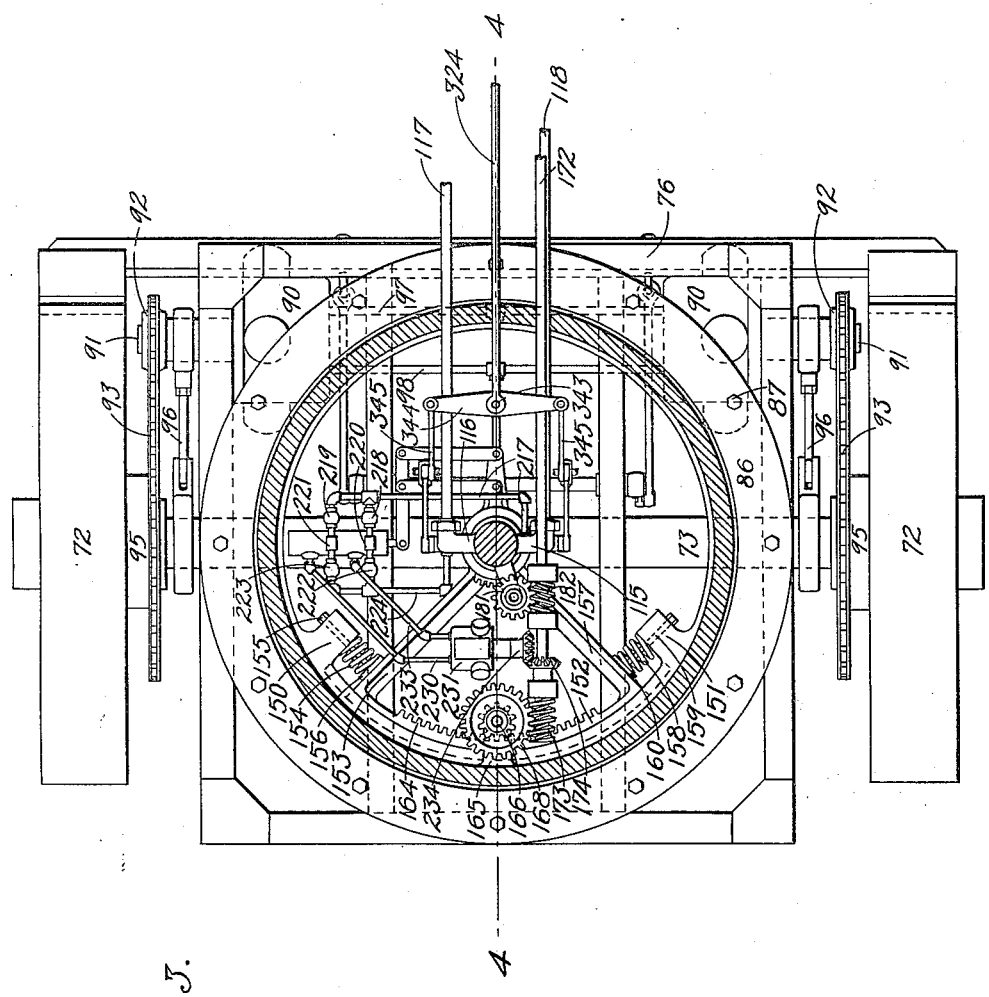

In the drawings, Figure 1 is a partial plan view of a motor vehicle embodying the features of my invention, but with a portion of the braking, steering and hoisting apparatus removed; Fig. 2 is a side elevation of Fig. 1 with the hoisting apparatus added; Fig. 3 is a plan view partly in section on the line 3—3 of Fig. 2; Fig. 4 is a partial sectional elevation on the line 4—4 of Fig. 3; Fig. 5 is an end elevation of a yoke belonging to the braking apparatus and is hereinafter more particularly referred to; Fig. 6 is a plan view partly in section on the line 6—6 of Fig. 2; Fig. 7 is an elevation partly in section on the line 7—7 of Fig. 6; Fig. 8 is a detached plan view of the sub-frame for the engine, and certain parts of the driving gear, which it supports and is hereinafter more particularly referred to; Fig. 9 is a side elevation of Fig. 8; Fig. 10 is an end elevation of Fig. 8; Figs. 11, 12, 13, 14 and 15 are detached detailed views hereinafter referred to; Figs. 16, 17 and 18 are detached enlarged views of part of the steering apparatus; Figs. 19, 20, 21 and 22 are detached enlarged views of one form of the braking apparatus; Fig. 23 is a detached enlarged side elevation of the hoisting apparatus; Fig. 24 is a detached plan view thereof; Fig. 25 is a detail in section hereinafter explained.

In the drawings I have shown my new motor vehicle as comprising a fluid operated variable speed gear such as described and claimed in my Letters Patent No. 801,097, and here shown as embodying certain modifications adapting it for use in combination with my motor vehicle, though it is to be understood that I do not confine my present invention to a use in combination with a variable speed gear, such a combination being adopted herein mainly for the purpose of more clearly illustrating an improved and valuable relation in which my improvements in motor vehicles may be used.

Referring now to the drawings, in which the same reference characters relate to the same or corresponding parts in all the views, I will first describe the essential parts of the variable speed gear and its mode of operation.

In Figs. 1, 2, 8, 9 and 10, the numeral 50 designates a driving engine here shown as of the internal combustion type, though it is to be understood that I do not limit myself to any type or form of driving engine or motor. The supporting arms 51 of the engine rest on a floating frame 52 and are secured thereto by the bolts 53. The floating frame 52 is supported at three points by the springs 54 which are secured thereto by the bolts 55 and the straps 56, the springs themselves being supported by a sub-frame 57, which, by means of the vertical channels 58 secured thereto, is hung from the inner longitudinal beams 59 of the main frame of the vehicle. The springs 54 resting on the sub-frame 57 are suitably secured thereto by the brackets 60, and the floating frame 52 which is permitted vertical movement, due to vibration and the reaction of the springs 54, is guided in its vertical movement by the vertical channels 58 against the sides of which slide the brackets 61, on the floating frame 52. Supported on the floating frame 52 by the arms 62 is a multiple radial-cylinder pump 63, here shown as embodying three cylinders with their proper coöperating elements, and to which is fastened a casing 64 on which are formed supporting arms 65 which also rest on and are secured to the floating frame 52 by the bolts 66, and assist in supporting the said pump 63.

The crank shaft 67 of the engine 50 is continued to form, or is connected to, the shaft 68 which enters the casing 64 and drives the pump 63. Formed on the side of the casing 64 is a horn shaped projection 69 through which passes a rocker shaft 70 which enters the casing 64. On the outside squared end of the rocker shaft 70 is fastened the lever 71, which acts as the control lever for varying the length of stroke of the pump crank in the manner explained in detail in my Letters Patent above referred to.

It is here supposed that when the control lever 71 is in the vertical position as shown in Fig. 9, that the pump crank has no stroke, the crank pin having been adjusted to a zero position where it is concentric with the axis of the driving shaft 68, and that when the said control lever 71 is moved to either side of the vertical position that the pump crank pin will be adjusted so that it has a length of stroke proportionate to the extent of movement of the lever from the vertical position.

In the drawings of my patent above referred to, I have shown my variable speed gear as comprising a fluid pump, and a motor operated by fluid delivered from the pump, with the pump and motor fastened together and the motor shaft in line with the pump shaft, and in the description thereof, I have explained both how I effect the adjustment of the stroke of the pump crank while it is in motion, and how these variations in the length of stroke of the pump crank cause the motor to operate at correspondingly varying speed, and that the adjustment of the stroke of the pump crank from its zero position through varying amounts up to its maximum adjustment on one side of the zero point causes the motor to run at correspondingly variable speeds in one direction up to its maximum speed in this direction, while adjustments of the pump crank on the other side of the zero point causes the motor to operate at correspondingly variable speeds in the reverse direction. In the adaptation of this device to my new motor vehicle, I employ the one pump 63 in combination with, and supplying fluid under pressure to, several motors, these motors being placed directly on the trucks of the vehicle and here shown as connected to the respective vehicle wheels by means of sprockets and chains, this arrangement enabling me to place the motors where they will be in a relatively fixed position with reference to the respective vehicle wheels which they drive, and yet by suitable pipe connections permits the power from the pump to be delivered to the motors in the form of fluid under pressure when the motors are displaced with reference to the pump position, caused by the trucks having been angularly adjusted in steering the vehicle. I have therefore, shown the running gear of my new motor vehicle as comprising a main frame, a solid axle rear truck (shown in detail in Figs. 3 and 4), a solid axle front truck (shown in detail in Figs. 6 and 7), and accessory parts and apparatus hereafter more particularly referred to.

In Figs. 1, 2, 3 and 4, the rear truck is shown as comprising two wheels 72 which are rotatably mounted on the solid axle 73. At a suitable distance from the ends of the axle 73 are two semi-elliptic springs 74 secured at their mid point to the axle by means of the suspension clips 75, the ends of the springs 74 supporting the rectangular frame 76 to which they are connected by the brackets 77, fastened to the underside of said frame 76. Mounted on the frame 76, to which it is secured by bolts 78, is a casting 79, the upper part of the casting 79 being a circular ring in which is formed a circular groove 80, the outer wall 81 of the groove being here shown as higher than the inner wall 88. Rotatably mounted in the groove 80 is an inverted dish-shaped casting 82 having at its lower end a flange 85. The upper part of the casting 82 is rigidly fastened by suitable means to the longitudinal main frame members 59, and the truck frame 76 with its casting 79 is free to turn about the center of the casting 82, being rotatably supported thereon by means of the guard plate 86 secured by bolts 87 to the casting 79 and overlapping the flange 85 of the casting 82, the inner wall 88 of the groove 80, engaging the interior of the said casting 82.

Mounted on the frame 76 and suitably secured thereto by bolts 89 are two fluid pressure motors 90, and mounted on the crank shaft 91 of each motor and suitably secured thereto are sprockets 92, while coacting with the sprockets 92 are chains 93, connected to two sprockets 94, one of each being suitably secured to the inner side of the hub 95 of either wheel 72. Between each of the two motors 90 and the axle 73 are distance rods 96 of the usual construction for maintaining the proper distance between the driving sprockets and the wheels. The fluid circuits of the two motors 90 are connected together by the two pipes 97 and 98 and connected to the pipe 97 is a pipe 99 and connected to the pipe 98 is a pipe 100. Mounted at the center, and on the underside, of the circular casting 82 is a cylindrical chamber 101, forming part of a swivel union for the pipe connections between the pump and the motors and which is shown in enlarged section in Figs. 11 and 12. Entering the lower end of the bore of the chamber 101 is a cylindrical casting 102 having a circular flange 103, fitting a recess 104 in the said chamber 101, the said casting 102 being rotatably mounted in the said chamber 101 by means of the cap 105, bearing against the said flange 103. Entering one side of the casting 102 is a pipe 99 which, as previously explained, connects with the pipe 97, connecting the fluid circuits of the two motors 90. Formed in the upper portion of the cylindrical bore of the chamber 101 is a hollow stem 106 into which is rotatably fitted the pipe 107 in one side of which is the port 108. Intermediate of the length of the pipe 107 is a collar 109, resting against the internal shoulder 110 of the casting 102, and on the lower end of the pipe 107 is an elbow 111 into which is fastened the pipe 100 connected with the pipe 98, connecting the fluid circuits of the two motors 90. Near the top of the chamber 101 are the two horns 115 and 116, and the two channels 112 and 113, 112 connecting through the port 108 with the pipe 107, and 113 connecting through the interior of the castings 101 and 102 with the pipe 99. In the bottom of the casting 102 is a plug 114 which forms therewith a stuffing box around the pipe 107, the plug 105 fitting in the casting 101, against the flange 103 of the casting 102, forming with the recess 104 a stuffing box for this other joint.

The horns 115 and 116, channels 112 and 113, respectively, are bent at right angles at their outer ends and connected to them by ball type of union joints are the two pipes 118 and 117, respectively. These two pipes 117 and 118 pass toward the center of the vehicle where pipe 117 is connected by a ball type of union joint with the T 119, the pipe 118 connecting with the T 120, as shown in Figs. 1, 2, 8, 9, and 10. Connected with the bottom of the T 119 is a pipe 121, the other end of which is connected through a ball type of union joint with the horn 122 formed on, and through which it is connected with one side of the fluid circuit of the pump 63, while the T 120 is similarly connected by the pipe 123 through the horn 124 with the other side of the fluid circuit of the pump 63.

The forward truck (shown in detail in Figs. 6 and 7), is similar to the rear truck, except that it is here shown (for reasons hereinafter explained) as comprising only one fluid operated motor 125, in place of the two motors 90 of the rear truck, the single motor 125 serving to drive the two forward wheels 126 through a differential jack-shaft 127 of well known type, and here shown as having the large bevel gear 128 of the differential driven by the bevel pinion 129 which is fastened to the crank-shaft of the motor 125. The sprockets 130, chains 131, and sprockets 132 mounted on the hubs 133 of the wheels 126, serve to convey the power from the motor 125 to the wheels 126, the distance rods 134 being interposed between the jack-shaft 127 and the axle 135 to maintain the proper distance between the driving and driven sprockets. The inverted dish-shaped casting 136 has secured to its under side the swivel union 137, here shown as a duplicate of the swivel union of the rear truck (Figs. 11 and 12) previously described, and the swivel union 137 is connected through the pipes 410 and 411 with the fluid circuit of the motor 125.

The two horns 138 and 139 of the swivel union 137 are connected by ball type of union joints, with the two pipes 140 and 141, respectively; the said two pipes passing back toward the center of the vehicle and the pipe 140 being connected at its other end by a ball joint with the T 119, and the pipe 141 being similarly connected to the T 120, the motor 125 driving the front wheels being thus connected through its pipes, with the same T's 119 and 120 through which it is connected with the single pump 63, and thus providing a closed fluid circuit through which fluid under pressure is circulated from the pump to the motors, (both the front one and the rear ones) and thus delivering the power from the engine 50 to the rear driving wheels 72 and the front driving wheels 126.

It is obvious that the front truck may carry two motors in the same way, and be in all respects a duplicate of the rear truck, or the rear truck may be in all respects a duplicate of the front truck and have only one motor driving the wheels through a differential jack-shaft, and I have here shown the rear truck with one mode of driving and the front truck with the other mode, in order to emphasize the fact that I do not confine myself to the use of either double motors or a single motor for each truck.

Referring now to Figs. 1, 2, 8, 9 and 10, mounted on one of the vertical channels 58 is a bracket 142 on which is rotatably fastened a double arm lever 143, to the lower arm of which is connected link 144, the other end of the link being connected to the upper end of the pump-stroke-adjusting-lever 71. To the upper arm of the lever 143 is connected a link 145, passing to the front of the vehicle, the front end of the said link 145 being connected to the lever 146, fastened on the rocker-shaft 147 on which is mounted a speed control lever 148, thus enabling the operator from the seat 149 to effect the adjustments of the stroke of the pump, which as previously explained effects the changes in the speed of the vehicle both forward and backward; it being here supposed that the motions of the speed lever 148 toward the front of the vehicle cause the vehicle to be driven forward at speeds proportionate to the extent of such adjustments toward the front, while motions of the said lever 148 toward the rear cause the vehicle to be driven in the reverse direction at speeds proportionate to the extent of such adjustments toward the rear.

As previously explained, the engine 50 and the pump 63 are mounted on the floating frame 52 which is supported through the springs 54 at three points by the sub-frame 57, rigidly connected by the vertical channels 58 to the longitudinal main frame members 59, the object of this being to give the engine and pump a three point suspension enabling them to be kept perfectly in line no matter how much the frame may be twisted out of shape, and also to give a spring suspension to the said pump and engine which will not be affected by fluctuations in the weight of the load on the vehicle. In order to permit a proper degree of flexibility in the piping connections between the pump (which will be caused to vibrate more or less with reference to the body of the vehicle owing to the roughness of the road) and the other parts rigidly secured to the frame of the vehicle and with which the pipes connect, I prefer to make the union couplings joining the pipes, of the ball and socket type which permit a certain freedom of motion between the respective parts, and in order to provide for still more flexibility in the piping system, to allow a greater amount of vertical motion to the pump with reference to the frame of the vehicle, I prefer to make a loop in the pipes 140 and 141 as clearly shown in Figs. 8 and 9, such a loop providing a simple means for allowing the pipes to lengthen and shorten as the pump vibrates up and down.

While the steering of a small motor vehicle can be very simply accomplished by hand by the operator, yet on large freight vehicles it becomes a very difficult and tiresome task, and I have therefore provided means for utilizing power from the engine (or from the motion of the vehicle itself should the engine be shut down while the vehicle is moving) for relieving the operator of the manual exertion required for steering. In such a type of vehicle as is here illustrated I prefer to accomplish this power steering in the manner which I will now describe, which not only provides for power steering but also for enabling the operator to perform the steering by manual exertion should the power steering apparatus become deranged or the power give out, and by the operator making the same motions when steering by hand that he does when utilizing power for doing the work.

Referring now to Figs. 3 and 4; on the inner end of the casting 79 are the two lugs 150 and 151 and between these two lugs is a quadrant 152 the circumferential length of which is less than the circumferential distance between the two lugs 150 and 151. Placed between the arm 153 and the lug 150 is a spring 154 which is given a certain initial compression by means of the bolt 155 and the cap 156, while placed between the arm 157 and the lug 151 is a similar spring 158 having an initial compression by means of the bolt 159 and its cap 160, the quadrant 152 thereby being held normally midway between the lugs 150 and 151 while the springs 154 and 158 resist displacement of the quadrant in either direction. Formed at the center of curvature of the quadrant 152 is a ring 161 rotatably mounted on the cylindrical casting 101 on which is screwed a nut 163 to hold the said ring in place. On the inner edge of the quadrant 152 are gear teeth 164, and on the inside of the inverted dish-shaped casting 82 is a bracket 165 in which is rotatably mounted a shaft 166 on the lower end of which is secured a pinion 167 meshing with the gear teeth 164 of the quadrant 152, while on the upper end of said shaft 166 is fastened a worm wheel 168. Mounted on the underside of the dish-shaped casting 82 are shaft hangers 169, 170 and 171, carrying the shaft 172, on one end of which is fastened the worm screw 173 meshing with the worm wheel 168. Integral with the worm screw 173 is a bevel gear 174, the combined worm and gear being keyed to the shaft 172 and prevented from longitudinal displacement by the groove 175, the edges of which are in contact with the sides of the hanger 169. Rotatably mounted on the casting 101, between the shoulder 162 and the ring 161 of the quadrant 152, is a collar 176 on which are gear teeth 177 which cover a portion of its outer circumference.

On the side of the casting 101 is a bracket 178 in which is rotatably mounted a vertical shaft 179 on the lower end of which is fastened a pinion 180, while on the upper end is fastened a worm wheel 181. Fastened on the shaft 172 between the hangers 170 and 171 is a worm screw 182 meshing with the worm wheel 181. The shaft 172 extends from the rear of the motor vehicle to the front where it passes over the front truck, at which point (Figs. 6 and 7), it is supported by shaft hangers 183, 184, 185 and 186. Mounted on the shaft 172 between the shaft hangers 183 and 184 is a worm screw 187 meshing with a worm wheel 188, fastened to the upper end of the vertical shaft 189, rotatably mounted in a bracket 190 on the inner wall of the dish-shaped casting 136. On the lower end of the shaft 189 is fastened a pinion 192 meshing with gear teeth 193 formed on the inner edge of the quadrant 194, held between the lugs 195 and 196, on the inner edge of the casting 197, and the springs 198 and 199 in a manner similar to that heretofore explained for the rear truck, these parts being duplicates in the front and rear trucks. In a manner similar to that in the rear truck, the quadrant 194 is rotatably mounted at its center of curvature on the casting 137 by means of the quadrant arms 200 and 201 the ring 202 and the shoulder 203 on the casting 137. Between the ring 202 and the shoulder 203 is a collar 204 on which are formed the gear teeth 205, meshing with the pinion 206, fastened on the lower end of the shaft 207, rotatably mounted in the bracket 208 formed on the side of the casting 137. On the upper end of the shaft 207 is fastened a worm wheel 209, meshing with the worm screw 210 fastened to the shaft 172 between the hangers 185 and 186. The shaft 172 is prolonged forward beyond the front truck to where it is mounted in a shaft hanger 211, (see Fig. 2), and on the end of the shaft 172 is fastened a bevel gear 212 which meshes with a bevel gear 213 fastened to the vertical steering shaft 214 on the top of which is fastened the steering wheel 215, said steering shaft being supported and maintained in position by the vertical column 216 suitably fastened to the vehicle.

It is evident that by turning the steering wheel 215 the shaft 172 will be rotated correspondingly and through the worm 187, worm wheel 188, pinion 192, gear teeth 193 and the quadrant 194, and the springs 198 and 199 co-acting with the lugs 195 and 196, will cause the front truck to be turned through an angle with reference to the body of the vehicle, the amount of the angle and the direction through which the truck is turned depending on the extent and direction of movement of the steering wheel 215. At the same time the motion of the shaft 172 will cause the rear truck through the corresponding worm wheels, pinions, quadrant, lugs, etc., to be turned an equal amount but in the opposite direction from that of the front truck, thereby causing the front and rear wheels to "track" in turning the vehicle. This description is on the assumption that the steering is done by hand, but in order to provide means for utilizing power for steering, I tap the fluid circuit of the driving gear and utilize this fluid pressure for operating the steering mechanism in the manner which I will now describe.

Referring now to Figs. 3, 4, 16, 17 and 18; leading from the channel 112 in the horn 115 of the cylindrical chamber 101 is a pipe 217 at the other end of which are two check valves 218 and 219 which connect with the T's 220 and 221 respectively. Connected to the other side of the T's are two other check valves 222 and 223 which are connected through the pipe 224 with the channel 113 in the horn 116 of the cylindrical chamber 101. The check valve 218 is so arranged that it will permit fluid to pass through it from the T 220 to the pipe 217 but will not permit fluid to pass in the opposite direction. Similarly the check valve 222 will permit fluid to pass through it from the T 220 to the pipe 224, while the check valve 219 will permit fluid to pass through it from the pipe 217 to the T 221, and the check valve 223 will permit fluid to pass through it from the pipe 224 to the T 221. With this arrangement of check valves, if the pipe 217 is connected to the pressure side of the main fluid circuit it will convey fluid under pressure to the T 221, while the T 220 will be connected through the pipe 224 to the suction side of the main fluid circuit. Similarly if the pipe 224 is connected to the pressure side of the fluid circuit it will convey fluid to the T 221 while the T 220 will be connected to the suction side through the pipe 217.

Referring now more particularly to Figs. 16 and 17; the lower branch of the T 220 is connected by the pipe 225 with the interior of the valve chamber 227, and similarly the lower branch of the T 221 is connected by the pipe 226 to this same valve chamber 227. In the bore 228 of the valve chamber 227 is a port 229 from which leads a pipe 230 connecting with one side of the fluid circuit of a motor 231 (see Figs. 3 and 4) mounted on the underside of the dish-shaped casting 82. In the valve chamber 227 near its left hand end, is another port 232 to which is connected a pipe 233, leading to the other side of the fluid circuit of the motor 231. Fastened on the crank shaft of the motor 231 is a bevel gear 234 meshing with the bevel gear 174 on the steering shaft 172. Mounted in the bore 228 of the valve chamber 227 is a valve 235 comprising two heads 236 and 237, here shown with the head 236 covering the port 229 and the head 237 covering the port 232. The stem of the valve 235 passes through a plug 238 closing the end of the valve chamber 227. In the outer end of the stem of the valve 235 is a slot 239, in which is connected a link 241 the other end of which is connected to the link 243, the other end of the link 243 being connected to the lever arm 245 on the quadrant ring 161. At a point intermediate of the length of the link 241 is connected a link 247, the other end of which is connected to the lever 249 on the ring 176. In one side of the valve chamber 227 is a channel 250 which leads into either end thereof and thus connects them together. The worm 173 and the bevel gear 174 integral therewith is mounted on the shaft 172 and is fastened thereon by a key 251 projecting into the key-way 252, the key-way 252 being much wider than the key 251 to allow a certain lost motion between the shaft 172 and the worm and gear. Should the operator now turn the steering shaft 172 when the key 251 is midway of the lost motion in the key-way 252 of the worm 173, before the said key comes in contact with the side of the said key-way of the worm 173, the worm 182 on the shaft 172 meshing with the worm wheel 181 on the upper end of the shaft 179 will have caused the pinion 180 through the teeth 177 on the ring 176 to move the lever 249 to one side or the other depending on the direction in which the steering shaft 172 is moved.

Assuming that the lever 249 is moved toward the left in Fig. 16 it will force the link 247 and through it the link 241 and the valve 235 toward the left, thereby uncovering the ports 229 and 232, and any fluid pressure brought into the valve chamber 227 by the pipe 226 will be free to pass through the pipe 233 into one side of the fluid circuit of the motor 231 which operating the motor 231 will thereby cause the bevel gear 234 through the bevel gear 174 and the worm 173 to turn the worm wheel 168, on the upper end of the shaft 166, and thereby the pinion 167 meshing with the teeth 164 of the quadrant 152 will cause the spring 154 reacting against the lug 150 to turn the casting 79 and the truck frame 176 in a clockwise direction (as viewed in Fig. 3), and the quadrant ring 161 moving therewith moves the lever 245 in this same direction, which through the link 243, and the link 241 moves the valve 235 toward the right in Fig. 16, thereby causing the valve heads 236 and 237 to move back toward the ports 229 and 232 until the lever 245 catches up with the lever 249, at which time the valve heads will have been returned to their original position covering the ports 229 and 232. Similarly if the shaft 172 is turned in the opposite direction, thereby causing the lever 249 to be adjusted in the opposite direction, the valve 235 will be moved toward the right thereby permitting fluid pressure, through the pipe 226, the port 229 and from thence through the pipe 230, to pass into the opposite side of the fluid circuit of the motor 231, which in a manner similar to that described above will cause the truck to be adjusted in the opposite or counter-clock-wise direction until the lever 245 over-takes the lever 249, when the valve 235 will again close the ports 229 and 232. The relative positions of the links and levers of the valve control are shown, for several adjustments, by dotted lines in Fig. 16.

In the above description, when fluid pressure brought in through the pipe 226 is admitted through the port 229 to one side of the fluid circuit of the motor 231, exhaust fluid from the said motor 231 will have free access through the pipe 233, the port 232, and the pipe 225 back to the main fluid circuit of the pump 63 through either the pipe 217 or the pipe 224, depending on which is at the particular moment the suction side, and vice versa when the displacement of the valve in the opposite direction admits fluid pressure to the other side of the fluid circuit of the steering motor 231. The springs 154 and 158 placed respectively between the lugs 150 and 151 and the arms 153 and 157 of the quadrant 152 are employed to give elasticity to the steering apparatus and thereby prevent constant small shocks, due to obstacles in the road, from being transmitted to the working parts of the steering mechanism.

Referring now to Figs. 6 and 7, the apparatus for utilizing power for steering the front truck is a practical duplicate of that for the rear truck, the valve chamber 253 being connected through the T's 254 and 255, check valves 256 and 257, the pipe 258 and the horn 139 of the casting 137 with one side of the main fluid circuit, and through the T's 254 and 255, check valves 259 and 260, the pipe 261 and the horn 138 with the other side of the main fluid circuit. The steering control valve 262 is connected through the link 263 and the link 264 with the lever 265 formed on the ring 204, while the link 266 also connects the link 263 with the lever 267 on the quadrant ring 202. The steering valve 262 is thus made to control the steering motor 268 through the pipes 269 and 270 connecting the two sides of the fluid circuit of the motor with the valve chamber 253. Mounted on the crank shaft of the steering motor 268 is a bevel gear 271 meshing with the bevel gear 272 integral with the worm 187 and mounted on the shaft 172. It should be noted that whereas the worm 173 of Figs. 3 and 4 is right hand, the corresponding worm 187 of Figs. 6 and 7 is left hand; and that whereas the worm 182 of Figs. 3 and 4 is left hand, the worm 210 of Figs. 6 and 7 is right hand, this change in these worms being made so that the front truck is caused to turn in a direction opposite to that in which the rear truck is turned through turning the steering shaft 172 in one direction or the other, and thereby the wheels of the front and rear trucks "track" properly when the vehicle is making a turn.

In order to provide an additional safeguard against either of the trucks not steering in unison with the other, I employ on the rear truck a flexible tension member (Figs. 1, 2, 4 and 7) such as a chain 301, mounted on the exterior circumference of the ring of the casting 79 and which is secured to the said casting 79 by some means as a bolt 302. Similarly on the casting 197 of the front truck is mounted a chain 303 secured to the said casting 197 by the bolt 304. Connected to one end of the chain 301 is an eye-bar 305, placed diagonally under the vehicle and connected at its other end to one end of the chain 303, the other end of the chain 303 being connected to the eye-bar 306 which also runs diagonally under the vehicle and is connected at its other end to the other end of the chain 301. Through the employment of the chains 301 and 303 and the eye-bars 305 and 306 means are provided for insuring that both trucks will be properly steered even should the steering apparatus on one of them break down. It is also evident that through the fact that each truck re-acts on its steering quadrant through springs, the striking of an obstacle by one truck will necessitate the overcoming of the inertia of the other truck, connected to it through the eye-bars and chains, before the shock will be felt on the steering mechanism of either truck, and this is the case whether the steering is done by manual exertion or by power derived from the driving engine.

While the manual exertion required of the operator in applying the brakes on a small motor vehicle is comparatively light, yet on a large machine of several tons capacity the work becomes most laborious, and in order to make negligible the manual exertion required in braking large motor vehicles, I provide means, which I will now describe, for utilizing power derived either from the driving engine, or from the momentum of the vehicle itself, for performing the work of braking, which is so arranged that while the work will be done by power whenever there is power that may be used for the purpose, yet enables the operator to apply the brakes by manual exertion should there be no power, or should the mechanism of the power brakes fail for any cause.

At the front of the vehicle (Figs. 1 and 2) is a foot pedal 307 secured to a rocker-shaft 308 mounted in the bracket 309 secured to the foot board 310, and at the other end of the rocker-shaft 308 is fastened a vertical lever 311 to the lower end of which is connected a rod 313. At the other end of the rod 313 (Figs. 6 and 7) is a yoke 314 having therein oblong pin slots 315, and mounted in the yoke 314 is a yoke 316 in which is fastened a pin 317 which projects through the pin slots 315. The yoke 316 is prolonged into the rod 318 at the other end of which is formed an eye 319, by which it is connected to the link 321 at a point intermediate of its length. To one end of the link 321 is connected the eye 323 of the rod 324, the said rod 324 being prolonged toward the rear of the vehicle. To the other end of the link 321 is connected the eye 326 of the rod 327, and at the other end of the rod 327 is an eye 328 connected to the center of the link 330. Connected to each end of the link 330 are links 331, the other end of which are connected to the upper arms of the bell crank levers 332 passing through the casting 136, the bell cranks being secured to the underside thereof by the brackets 333. Connected to the horizontal arms of the bell cranks 332 is a U shaped yoke 335, the outlines of which are shown more clearly in Fig. 5.

At the bottom of the yoke 335 is a swivel hanger 336, and fastened to the truck frame 191 is a longitudinal frame member 337 on which is mounted a bracket 338 carrying a bell crank lever 339. The horizontal arm of the bell crank 339 is fastened to the swivel hanger 336 of the yoke 335 while to the other arm of the bell crank is fastened an eye-bar 346 to the other end of which is connected a brake beam 341 suitably suspended from the truck frame. Mounted on the brake beam 341 are brake shoes 342 here shown as arranged to be applied to the circumference of the wheels themselves, but which, of course, may be applied to brake drums mounted on the wheels, if desired.

The rod 324 extending toward the rear of the vehicle terminates in an eye 343 connected to the center of the link 344 (see Figs. 3 and 4). The link 344 through the rods 345, bell cranks 346, yoke 347, swivel 348, bell crank 349 and rod 350 is connected with the brake beam 351 which carries the brake shoes 352 and which is suitably suspended from the rear truck frame 76.

Pressure applied to the foot pedal 307, acting through the various rods, links and levers, will cause the brake shoes 342 to be applied to the front wheels 126 at the same time that the brake shoes 352 are applied to the rear wheels 72, and this will be the case no matter through what angle the front and rear trucks are turned, since the swivel hanger 336, joining the parts which move with the truck to those which are relatively fixed with reference to the frame of the vehicle, permits the turning of the front truck, and the swivel hanger 348 permits the turning of the rear one. In Fig. 7 it will be noted that in connecting the eye-bars 319, 323, and 326 to the link 321, the eye-bar 319 is here shown as placed closer to the eye-bar 323 than to the eye-bar 326, this being done to insure that the brakes on the rear wheels will be applied more powerfully than the brakes on the front wheels, the object being to minimize the danger of the vehicle turning over, due to too much of the braking being done on the front wheels.

In order to provide power operated apparatus which will act in conjunction with the braking apparatus described above, I employ a brake cylinder 353 fastened to the longitudinal members 59 of the main frame of the vehicle by means of arms 354, shown in Fig. 6 with the arms 354 broken off. Mounted in the brake cylinder 353 (Fig. 25) is a piston 355, the piston rod 356 of which extends beyond the right hand end of the cylinder. On one side of the brake cylinder 353 is a brake control valve (Figs. 6 and 7) here shown as a duplicate of the steering control valve shown in detail in Figs. 16 and 17, the brake control valve chamber 357 being connected to either end of the brake cylinder 353 by means of the pipes 358 and 358'. The valve chamber 357 is supplied with fluid by means of the two pipes 359 and 360, here shown broken, which connect respectively with the T's 254 and 255, through which, as previously described, fluid is supplied to the steering control valve 253 of the front truck. Connected to the main frame of the vehicle by a bracket 361 (shown broken in Fig. 6) is a link 362 in the end of which is a pin 363 fitting the sides of the oblong slot 364 in the bracket 361. The other end of the link 362 is mounted in the yoke 316 with which it has a rocking connection through the pin 317. Connected to the rod 313 is a link 365 the other end of which is connected to the bracket 366 which is supposed to be fastened to the main frame of the vehicle. Connected to the link 365, at a point intermediate of its length, is a link 367 the other end of which is connected to one end of the link 368, the other end of the link 368 being connected to the valve rod 369 of the brake control valve 357. Connected to the link 368 at a point intermediate of its length is a link 370 the other end of which is connected to the link 362, the various links being of such relative lengths that when the links 362 and 365 are simultaneously displaced an equal amount in the same direction the brake control valve 357 will not be displaced. Assuming now that the foot pedal 307 is depressed, the rod 313 will be pulled toward the right in Fig. 6, which motion will cause the link 365, through the links 367 and 368, to force the valve rod 369 of the brake control valve toward the left and the valve 357 (here supposed to be a duplicate of the steering valve shown in Figs. 16 and 17) will uncover the ports of the valve chamber permitting, we will suppose, any fluid under pressure in the pipe 360 to pass into the left hand end of the brake cylinder 353, and thus cause the piston rod 356 which abuts against the lever 362 (and which has not been moved owing to the lost motion between the eye 314 of the rod 313 and the pin 317) to force the link 362 to the right and thus through the various rods, links, and levers, applying the brakes to the front and rear wheels, such motion of the link continuing until the link 370 connecting it through the link 368 to the valve rod 369 shall have caused the brake control valve to close the ports and thereby cut off the fluid from the brake cylinder 353. Similarly, if the foot pedal is released, the spring 325, which had been compressed by the depression of the pedal, will cause the link 365 to move toward the left in Fig. 6, thereby moving the valve rod 369 of the brake control valve toward the right and thereby uncovering the ports so that the right hand end of the brake cylinder 353 will be connected to the pressure side of the fluid circuit which will thereby force the brake piston rod 356 toward the left and thus relieve the pressure on the brakes to an extent proportional to the amount that the link 365 has been moved toward the left by allowing the foot pedal 307 to rise.

While in general it is assumed that the fluid pressure for both the power steering and the power braking will be supplied by the pump 63, driven by the engine 50, yet should the vehicle be moving in either direction due to its momentum or to gravity, fluid pressure would be created in the fluid circuit due to the motors 90 and 125 acting as pumps, and thereby supplying fluid pressure which, if desired, may be used for steering and braking.

In the above description, of the apparatus for using power for braking, the pressure of the brake shoes on the wheels is dependent on the pressure of the fluid in the fluid circuit of the driving gear. In Figs. 19, 20, 21 and 22 is shown an alternative type of power brake which I will now describe. Mounted on the rod 318 (which is the same as the rod 318 of Figs. 6 and 7), and firmly secured thereto is a cleat 371. Connected to the brake rod 313 is the link 365, both of which are the same as the parts having corresponding numerals in Figs. 6 and 7. Mounted on the main frame of the vehicle is a brake cylinder 353 secured thereto by the arms 354 (shown in Fig. 19 as broken, and with the brake cylinder in such position that the piston rod 356 extends from the left hand end of the cylinder).

Connected to one side of the brake cylinder by the pipes 358 and 358' is a brake control valve chamber 372 which is connected to the main fluid circuit by the pipes 359 and 360. Mounted in the bore 373 of the valve chamber 372 is a valve 374 comprising two heads 375 and 376. In the valve chamber 372 are two ports 377 and 378 through which the two pipes 358 and 358' are connected to it. In one side of the valve chamber 372 is a channel 379 which leads into and connects together the two ends of the said valve chamber. Connected to the end of the stem of the valve 374 is a link 380, the other end of which is connected by the link 381 to the link 365 at a point intermediate of its length. Connected to the link 380 at a point intermediate of its length is a link 382 the other end of which is connected to a link 383, having one end connected to the bracket 384 secured to the main frame of the vehicle. The other end of the link 383 normally abuts against the cleat 371 on the brake rod 318, and connected to the link 383 near this end is a spring abutment piece 385 against which the spring 386 presses, the other end of the spring 386 pressing against the abutment piece 387 fastened to the main frame of the vehicle. Connected to the link 383 by the pin 388 is a link 389 having the other end connected with the brake piston rod 356.

Assuming that the brakes are pressing against the wheels and that the foot pedal 307 which has been depressed is now allowed to rise to a small extent, the parts will then be in the positions shown with the pipe 360 connected to the pressure side, and the pipe 359 to the suction side, of the fluid circuit and fluid will pass into the valve chamber 372, through the port 378, the pipe 358' and into the right hand end of the brake cylinder 353, thereby causing the piston rod to be forced to the left which in turn compresses the spring 386 allowing the cleat 371 to move toward the left, and thereby reducing the pressure on the brakes (which has been caused by the spring 386) until the motion of the lever 383 through the links 382 and 380 shall have forced the valve 374 to the left to the point at which the valve head 376 covers the port 378, thereby shutting off the fluid pressure from the brake cylinder 353. Should the operator desire to further reduce the pressure of the brakes, it may be done by further relieving the pressure on the foot pedal 307, which causes the brake rod 313 to be moved to the left in Fig. 19, which, through the links 365, 381 and 380, causes the valve 374 to be moved to the right, permitting still more of the fluid under pressure to pass from the pipe 360 into the right hand end of the brake cylinder 353, thereby compressing the spring 386 and relieving the brakes still further.

Should the operator desire to apply the brakes it is only necessary to depress the foot pedal 307, thereby moving the brake rod 313 toward the right (in Fig. 19), thus forcing the brake control valve 374 toward the left until the head 376 has passed beyond where it covers the port 378, thus permitting fluid which is in the right hand end of the brake cylinder 353 to pass out through the pipe 358' into the right hand end of the valve chamber 372, from which it is carried by the pipe 359 to the suction side of the main fluid circuit. By thus allowing the fluid pressure in the right hand end of the brake cylinder 353 to pass out, the brake piston rod 356 will be unable to hold back the compression of the spring 386, which, acting through the link 383 against the cleat 371, will force the brake rod 318 to the right, thus forcing the brake shoes toward the wheels, the extent of such braking action being dependent on the extent to which the valve 374 has been forced to the left by means of the brake pedal 307 and the brake rod 313, for as the spring 386 forces the link 383 toward the right it also causes the link 382 through the link 380 to force the brake control valve 374 toward the right until the head 376 covers the port 378, thereby closing the passages through which the fluid in the brake cylinder 353 was allowed to escape. It is thus seen that the motion of the brake piston 356, and through it the brake spring 386 with the brakes which are actuated thereby, is in synchronism with the motions of the foot pedal which is under the control of the operator. It is also evident that with this alternative type of power brake the braking effect is not dependent on the pressure which may happen to be in the fluid circuit of the driving gear, and that should the driving gear break down entirely, the force stored in the compressed spring would still be available for applying the brakes and thereby stopping the vehicle. Moreover, it is to be particularly noted that with the parts in their normal positions the valve head 376 does not cover the port 378, but is on the right hand side of it as in Figs. 20 and 21, so that the tendency of the compression spring 386 to force the brakes against the wheels is counteracted only by the fluid pressure in the brake cylinder 353, and that since this fluid pressure is derived from the main fluid circuit of the driving gear, the spring 386 will automatically set the brakes whenever the fluid pressure in the main fluid circuit fails, or falls below a certain minimum value. However, should the operator desire to hold the brakes off from the wheels, and at the same time reduce the pressure in the main fluid circuit to a point below the minimum pressure that will overcome the compression spring 386, it may be done by depressing the foot pedal 307 only just enough to cause the control valve 374 to move toward the left to the point where the head 376 covers the port 378, thus trapping the fluid in the right hand end of the brake cylinder 353, and thereby holding the spring 386.

In the use of heavy motor vehicles, it is advantageous to have a hoisting drum or winch driven by power from the driving engine of the vehicle. While winches mounted on motor vehicles and driven by power derived from the engine have been employed by others, yet the mechanism which they have employed for conveying the power from the driving engine to the winch is cumbersome and rather unsatisfactory, especial difficulty and annoyance being caused by the suddenness with which the winch is brought into action through the sudden gripping of the clutches employed. Another serious objection to these winches has been that, except by serious complications in the mechanism for transmitting the power from the driving engine to the winch, it has been impossible in many instances to put the winches at the most advantageous points on the vehicle. Where the motor vehicle is equipped with a fluid pressure gear, such for example as I have shown in the drawings above described, it is a very simple matter to provide the vehicle with a winch driven by a fluid pressure motor deriving its fluid pressure from the pump of the driving gear, and since the power is conveyed from the pump to the winch motor by pipes connecting the two, it becomes possible to place the winch at any point desired on the motor vehicle, since the pipes being stationary parts they may be easily run around corners, and the flow of fluid through them will be in no way affected by the deflection of the vehicle frame due to strains of any kind. In Figs. 23 and 24 are shown the essential details of such a winch to be operated by means of a fluid pressure motor, and in Fig. 2 I have, for convenience, shown the winch, with its motor, as placed on the vehicle frame just back of the operator's seat, though, of course, it is to be understood that it can be placed anywhere desired, and connected by suitable pipes to the fluid circuit of the driving gear.

In Figs. 23 and 24 the winch is shown as comprising a frame 391 in which is mounted a shaft 392 on the ends of which are mounted rope drums 393, and also fastened to the shaft 392 is a gear 394. Mounted on the winch frame 391 is a fluid pressure motor 395 on the crank shaft of which is mounted a pinion 420 which meshes with the gear 394. Connected with one side of the fluid circuit of the motor 395 is a pipe 396 in which is a stop-cock 397, and connected to the other side of the fluid circuit of the motor is a pipe 398 in which is a stop-cock 399, the pipes 396 and 398 being shown as broken in Figs. 23 and 24, but being supposed to be continued from the motor 395 (wherever it may have been placed) to where the pipe 396 connects with the pipe 261, and the pipe 398 connects with the pipe 258, these two pipes 396 and 398 respectively being shown as broken in Figs. 6 and 7.

As previously explained in the description of the power steering mechanism, the pipe 261 is connected with one side, and the pipe 258 with the other side, of the main fluid circuit of the driving gear. The hoisting drum or winch on a motor vehicle is generally not in operation except when the vehicle is standing still, so that when the vehicle is running the stop-cocks 397 and 399 respectively are closed, thus cutting off the fluid pressure from the hoisting motor 395. Of course, however, if it is desired, the hoisting motor may be operated at the same time that the vehicle is running by opening the stop-cocks 397 and 399 and controlling the speed of the hoisting motor through these stop-cocks.

In operating the hoisting motor while the vehicle is standing still the vehicle may be prevented from turning by applying the brakes if it is desired, but I prefer to prevent the wheels from turning by placing stop-cocks or valves in the pipes which connect the wheel driving motors with the fluid circuit of the pump. I have therefore shown in Fig. 7 the stop-cock 400 in the pipe 410, and in Fig. 4 the stop-cock 401 in the pipe 99. These stop-cocks are normally open when the vehicle is being driven, but when the vehicle has been stopped and it is desired to use the hoisting motor, the stop-cocks 400 and 401 may be readily closed thus shutting off the power from the motors 90 and 125, so that the operator may run the driving engine and thereby the pump and thus supply fluid pressure to the motor 395. This enables the operator then to control the hoisting motor 395 by means of the speed control lever 148, and the wheel driving motors having been shut off by the stop-cocks in their pipes makes it unnecessary to apply the brakes on the wheels.

It is thus seen, from the foregoing description, that in my new motor vehicle a central power plant is provided which is not only employed for driving the vehicle but from which power may be readily utilized for steering, braking, and hoisting. It is also evident that by employing for the vehicle solid axle trucks so connected together that the striking of an obstacle by one truck necessitates the overcoming of the inertia of the other truck before the first truck can be deflected, I provide means whereby serious strains and sudden jerks are prevented from being transmitted to the moving parts of the steering mechanism.

Where it is found desirable to steer only one truck of the vehicle, the steering mechanism of the second truck and also the parts through which the two trucks are connected together (so that the inertia of the second truck has to be overcome before the first truck can be angularly displaced, due to striking an obstacle), may be dispensed with and this truck may then be rigidly fastened to the main frame of the vehicle.

The brakes need not necessarily be applied to all of the wheels, as in many instances the application of brakes to two of the wheels will be found sufficient. Should it be desired to apply the brakes to only the rear wheels of this vehicle, the eye bar 319 would be connected directly to the eye bar 323, Fig. 7, and the braking mechanism of the front truck dispensed with, and this is the case whether the rear truck be adjustable or fixed to the frame of the vehicle.

In operating motor vehicles it is dangerous to make turns at high speed, and I therefore provide means whereby the operator is prevented from turning the vehicle at the same speed that it travels when moving in a substantially straight course. Referring to the swivel union (Figs. 11 and 12) through which the fluid is conveyed from the vehicle frame to the truck, the port 108 in the pipe 107 is made of such a width with respect to the width of the channel 112 that a slight angle of adjustment (say 2 or 3 degrees) of the truck in steering will not reduce the area of the passage through which the fluid may pass, but beyond such a slight angle the passage is automatically reduced in width due to part of the port 108 being covered by the wall of the channel 112, such reduction in the passage being proportional to the angle of the truck, whereby the fluid passing to the motors is automatically throttled, thus reducing the volume of fluid passing to the driving motors in a given time, and thus the speed of the vehicle is automatically decreased in proportion to the angle through which the truck is adjusted in steering.

The invention, in respect to the more general features specified in the claims, is not limited to the particular devices herein described, for it is obvious that without departure from the principle of construction and operation the same results may be secured by many arrangements the well-recognized equivalents, mechanically, of those herein described.

I claim as my invention:

1. In a motor vehicle, comprising one or more driving elements, the combination with a driving engine, of a variable speed transmission gear in which a fluid is circulated under pressure and through which the engine delivers its power to the driving element, means for steering the vehicle, a motor operated by fluid pressure derived from the transmission gear for operating the steering means, and means for returning to the transmission gear the fluid used by the steering motor.

2. In a motor vehicle, comprising one or more driving elements, the combination with a driving engine, of a variable speed transmission gear having a fluid circuit with high pressure and low pressure sides thereto and through which the engine delivers its power to the driving element, means for steering the vehicle, a motor operated by fluid pressure derived from the high pressure side of the fluid circuit of the transmission gear for operating the steering means, and means for returning to the low pressure side of the fluid circuit of the transmission gear the fluid which operates the steering motor.

3. In a motor vehicle, comprising one or more driving wheels, the combination with a driving engine, of a variable speed transmission gear in which a fluid is circulated under pressure and through which the engine delivers its power to the wheels, means for steering the vehicle, a motor operated by fluid pressure derived from the transmission gear for operating the steering means, and means for returning to the transmission gear the fluid used by the steering motor.

4. In a motor vehicle, comprising one or more driving wheels, the combination with a driving engine, of a variable speed transmission gear having a fluid circuit with high pressure and low pressure sides thereto and through which the engine delivers its power to the wheels, means for steering the vehicle, a motor operated by fluid pressure derived from the high pressure side of the fluid circuit of the transmission gear for operating the steering means, and means for returning to the low pressure side of the fluid circuit of the transmission gear the fluid which operates the steering motor.

5. In a motor vehicle, comprising one or more driving elements, the combination with a driving engine, of a variable speed transmission and reverse gear having a fluid circuit with high pressure and low pressure sides thereto, which, at certain times, reverse their functions, and through which the engine delivers its power to the driving element, means for steering the vehicle, a fluid motor for operating the steering means, and means for delivering fluid pressure to said motor from whichever side of said fluid circuit is at that time the high pressure side thereof.

6. In a motor vehicle, comprising one or more driving elements, the combination with a driving engine, of a variable speed transmission and reverse gear having a fluid circuit with high pressure and low pressure sides thereto, which reverse their functions when the vehicle is reversed, and through which the engine delivers its power to the driving element, means for steering the vehicle, a fluid motor for operating the steering means, and means for delivering fluid pressure to said motor from whichever side of said fluid circuit is at that time the high pressure side thereof.

7. In a motor vehicle, comprising one or more driving wheels, the combination with a driving engine, of a variable speed transmission gear in which a fluid is circulated under pressure and through which the engine delivers its power to the wheels, means for braking the vehicle, a motor operated by fluid pressure derived from the transmission gear for operating the braking means, and means for returning to the transmission gear the fluid used by the braking motor.

8. In a motor vehicle, comprising one or more driving wheels, the combination with a driving engine, of a variable speed transmission gear having a fluid circuit with high pressure and low pressure sides thereto and through which the engine delivers its power to the wheels, means for braking the vehicle, a motor operated by fluid pressure derived from the high pressure side of the fluid circuit of the transmission gear for operating the braking means, and means for returning to the low pressure side of the fluid circuit of the transmission gear the fluid which operates the braking motor.

9. In mechanism for driving a vehicle and for performing hoisting work in connection therewith, the combination of a fluid motor connected to the driving wheels of the vehicle, a prime motor, and a pump interposed between said prime motor and said fluid motor and pumping fluid to the said fluid motor, a secondary fluid motor connected with and operating the hoisting mechanism of the vehicle, means for operating the said secondary motor by fluid supplied by the pump and means for returning to the transmission gear the fluid used by said secondary motor.

10. In mechanism for driving, steering and braking a vehicle, the combination with a prime motor, of a variable speed transmission gear in which a fluid is circulated under pressure and through which the prime motor delivers its power to the driving mechanism, means for utilizing fluid pressure from the said gear for operating the steering mechanism, and the braking mechanism, and means for returning to the said gear the fluid used by the said steering mechanism and the said braking mechanism.

11. In a motor vehicle for carrying variable loads, and comprising one or more driving elements, the combination with a driving engine, of a variable speed transmission gear through which the engine delivers its power to the driving element and through which a fluid is circulated under a pressure varying with the varying loads, means for steering the vehicle, and a motor for operating the steering means operated by the varying fluid pressure from the said gear, whereby the steering power will be increased with increased loads.

12. In mechanism for driving and braking a vehicle, the combination of a liquid motor connected to the driving wheels of the vehicle, a prime motor, and a variable stroke pump interposed between said prime motor and said liquid motor and pumping fluid to the said fluid motor, a braking mechanism, means for causing the braking mechanism to be normally applied, a secondary liquid motor connected with the braking mechanism and means for causing liquid supplied by the pump to operate the said secondary motor to counteract the said means which normally applies the said brakes.

13. In a motor vehicle, comprising a main frame, driving wheels, and springs interposed between said main frame and said driving wheels, the combination of a fluid motor connected to the driving wheels, a prime motor, and a pump interposed between said prime motor and said fluid motor and pumping fluid to the said fluid motor, a floating frame connected to the main frame through independent springs and supporting the prime motor and the pump, and flexible pipe connections between the said pump and the said fluid motor whereby the pump, the engine and the floating frame which supports them, may be free to vibrate with reference to the main frame.

14. In a motor vehicle, the combination of a fluid motor connected to the driving wheels of the vehicle, a prime motor, and a pump interposed between said prime motor and said fluid motor and pumping fluid to the said fluid motor, separate supports for said pump and fluid motor movable relatively to each other during the operation of said vehicle, and pipes, each having a coil in its length between said pump and said fluid motor whereby the distance between the said pump and the said fluid motor may fluctuate.

15. In a motor vehicle, comprising a main frame, driving wheels, and springs interposed between said main frame and said driving wheels, the combination of a fluid motor connected to the driving wheels, a prime motor, and a pump interposed between said prime motor and said fluid motor and pumping fluid to the said fluid motor, a floating frame connected to the main frame through independent springs and supporting the prime motor and the pump, and extensible pipe connections between the said pump and the said fluid motor whereby the distance between the said pump and the said fluid motor may fluctuate.

16. In mechanism for driving a vehicle and for performing hoisting work in connection therewith, the combination of a fluid motor connected to the driving wheels of the vehicle, a driving engine, and a variable stroke pump interposed between the said engine and the said fluid motor and pumping fluid to the said motor, a secondary fluid motor connected with and operating the hoisting mechanism, means for operating the said secondary motor by fluid supplied by the pump, and means for operating the stroke varying means to control either or both of said motors.

17. In a motor vehicle, the combination of a frame, a truck having a swiveling connection with said frame, a plurality of wheels supporting said truck and mounted to rotate in planes fixed relatively to said truck, a fluid motor carried by said truck and having driving connection with said wheels, a prime motor carried by said frame, a variable capacity pump carried by said frame and driven by said prime motor, and fluid delivery and return conduits connecting said pump and fluid motor, said conduits each having a joint located in the line of the axis of rotation of said truck.

18. In a motor vehicle, the combination of a frame, a plurality of trucks each having a swiveling connection with said frame, a plurality of wheels supporting each truck and mounted to rotate in planes fixed relatively to their respective trucks, a fluid motor carried by each of said trucks and having driving connection with a wheel thereof, a prime motor carried by said frame, a pump carried by said frame and driven by said prime motor, and fluid delivery and return conduits connecting said pump and fluid motors, said conduits each having a joint located in the line of the axis of rotation of the truck to which it leads.

In testimony whereof, I have signed my name to this specification, in the presence of two subscribing witnesses.

CHARLES M. MANLY.

Witnesses:
JAMES C. BARNABY,
L. D. EAKINS.